UNITED STATES PATENT OFFICE.

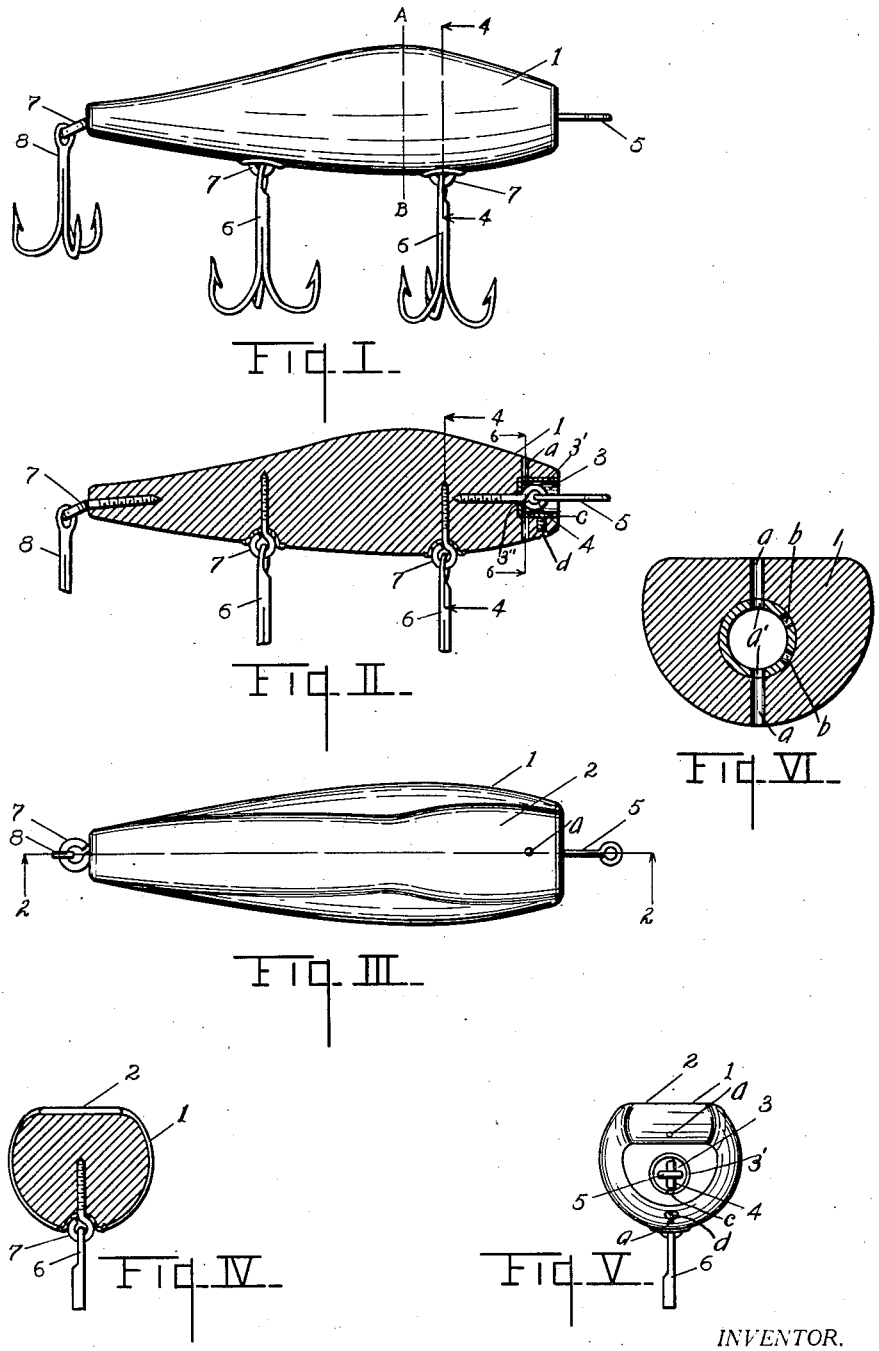

JOHN THOMAS McCORMIC, OF KALAMAZOO, MICHIGAN.

FISH BAIT OR LURE.

1,250,913.      Specification of Letters Patent.      Patented Dec. 18, 1917.

Application filed April 2, 1917. Serial No. 159,175.

*To all whom it may concern:*

Be it known that I, JOHN THOMAS MC-CORMIC, a citizen of the United States, residing at Kalamazoo, Michigan, have invented certain new and useful Improvements in Fish Baits or Lures, of which the following is a specification.

This invention relates to improvements in fish baits or lures.

The main objects of this invention are to provide an improved fish bait or lure having a zig-zag movement when drawn through the water simulating the movement of a swimming fish and one in which the body maintains a horizontal position in the water, the bait at the same time being simple and economical in structure.

Another object of my invention is to provide a bait of the kind described whereby the distance at which the bait travels beneath the surface of the water can be regulated.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a side view of my improved fish bait or lure.

Fig. II is a central vertical longitudinal section thereof on a line corresponding to line 2—2 of Fig. III.

Fig. III is a plan view thereof.

Fig. IV is a cross section on a line corresponding to line 4—4 of Figs. I and II.

Fig. V is a front elevation thereof.

Fig. VI is an enlarged detail section on a line corresponding to line 6—6 of Fig. II.

In the drawing similar reference characters refer to similar parts throughout the several views, and the sectional views are taken looking in the direction of the little arrows at the ends of the section lines.

Referring to the drawing the body 1 of my improved bait or lure is tapered toward both ends from a point A—B, which is well in front of the longitudinal center of the body.

The body is circular in cross section except that it has a flat top 2, the top being flattened from end to end of the body. The top of the forwardly tapered portion of the body is inclined forwardly while the top of the rearwardly tapered portion of the body is inclined rearwardly and slightly concaved. In the preferred construction the body is provided with a longitudinal bore or recess 3 in its front end, the recess being slightly below the axis,—see Figs. II and V.

Rotatably mounted in the recess 3 is a cylindrical shutter 3', the inner end of which is closed and provided with a central aperture 3'' through which the shank of the line attaching screw eye 4 is disposed. Vertically alined openings $a$ are formed in the head of the bait and open into the recess 3 adjacent the bottom thereof. The axis of these openings passes through the axis of the recess 3 whereby the diametrically opposed openings $a'$ in the shutter 3' may be brought into register with the openings $a$. With the shutter in this position, which is illustrated in Fig. VI, the openings $a$ have no appreciable effect upon the movement of the bait but the water passing through the recess 3 and the openings $a$ creates a slight disturbance at the top and bottom of the bait which makes it more effectual as a lure. When one of the openings $b$ is brought into register with the top opening $a$ the bottom opening $a$ is closed, and the reaction of the water, which passes out through the top opening $a$ against the bottom of the recess, causes the bait to swim at a greater depth; and when one of the openings $b$ is brought into register with the lower opening $a$ the upper opening $a$ is closed and the reaction of the water against the top of the recess 3 causes the bait to travel at a lesser depth. The shutter 3' may also be turned so as to entirely close the openings $a$, which will then have no effect upon the movement of the bait. The outer edge of the shutter 3' is provided with a notch $c$, which can be engaged by a knife blade or a suitable tool to turn the shutter 3' after the set screw d has been released from the shutter.

The forwardly inclined portion of the flat top of the body causes the bait to dive and travel below the surface of the water when drawn through the water. The action of the water on this flat top coacts with the action resulting from attaching the line to the body at the rear of its front end in securing the zig-zag or swimming motion. The bait travels through the water in a horizontal position as the water acts on the flat rear end of the top, resisting the tendency of the rear end of the bait to tilt upward.

A pair of hooks 6 are attached to the bottom of the body by means of screw eyes 7 while the rear hook 8 is attached to the rear end of the body by a screw eye 7. These hooks serve to weight the body sufficiently so that it maintains its upright position in the water. Where side hooks are used it is necessary to weight the bottom of the body. I have not shown such a weight, as the arrangement thereof is well known in this art.

My improved fish bait or lure is very simple and economical to produce and at the same time is very effective, its movement as it is drawn through the water being a very effective simulation of the swimming of a small fish or minnow.

Having thus described my invention what I claim as new and desire to secure by Letters Patent is:

1. A fish bait or lure comprising a cylindrical body portion tapered toward both ends from a point in front of its longitudinal center and having a flat top extending from end to end of the body, the top of the forwardly tapered portion of the body being inclined forwardly and the top of the rearwardly tapered portion of the body being inclined rearwardly, said body having a recess in its front end disposed below the flattened portion of the body, a line attaching means at the bottom of said recess, and a hook on said body.

2. A fish bait or lure comprising a cylindrical body portion tapered toward both ends from a point in front of its longitudinal center and having a flat top extending from end to end of the body, the top of the forwardly tapered portion of the body being inclined forwardly and the top of the rearwardly tapered portion of the body being inclined rearwardly, a line attaching means at the rear of the front end of said body, and a hook on said body.

3. A fish bait or lure comprising a cylindrical body portion tapered toward both ends from a point in front of its longitudinal center and having a flat top extending from end to end of the body, the top of the forwardly tapered portion of the body being inclined forwardly and the top of the rearwardly tapered portion of the body being inclined rearwardly, the front end of said body being provided with a longitudinally extending recess and having vertically alined openings extending therethrough and communicating with the bottom of said recess, a cylindrical shutter rotatably mounted in said recess and having alined openings adapted to register with the vertically alined openings of said body, intermediate openings adapted to register with but a single one of said vertically alined openings whereby the depth beneath the surface at which said baits swim may be regulated, means for attaching a line to said body, and a hook on said body.

4. A fish bait or lure comprising a cylindrical body portion tapered toward the front end, the front end of said bait being provided with a cylindrical longitudinally extending recess and transverse openings communicating with said recess, a cylindrical shutter rotatably mounted in said recess and provided with openings registering with said transverse openings in said body, and intermediate openings adapted to register with but a single one of said vertically alined openings in said body, line attaching means adjacent the bottom of said recess, and a hook on said body.

5. A fish bait or lure comprising a body provided with a recess in its front end and opposite disposed openings communicating with said recess and opening through the outer surface of said bait, means for opening or closing either one, or both, of said openings, means for attaching the line to the body at the rear of the front end thereof, and a hook on said body.

6. A fish bait or lure comprising a body provided with a recess in its front end and openings communicating with said recess and opening at the top and bottom of the bait, and a cylindrical shutter disposed in said recess to control said opening.

7. A fish bait or lure comprising a body provided with a recess in its front end and an opening communicating with said recess and opening at the surface of the bait, a cylindrical shutter disposed in said recess to control said opening, and a line attaching eye disposed through said shutter and adapted to retain it in said recess.

8. A fish bait or lure comprising a body provided with a recess in its front end and an opening communicating with said recess and opening at the surface of the bait, and a cylindrical shutter disposed in said recess to control said opening.

9. A fish bait or lure comprising a body portion provided with a recess in its front end, a bore communicating with said recess and extending through the outer surface of said body, adjustable means for controlling the passage of water through said bore, means for attaching a line to said body, and a hook on said body.

10. A fish bait comprising a body portion provided at its front end with a recess, adjustable means in said recess for controlling the depth at which the bait swims, means for attaching a line to said body, and a hook on said body.

In witness whereof, I have hereunto set my hand and seal in the presence of two witnesses.

JOHN THOMAS McCORMIC. [L. S.]

Witnesses:
LUELLA G. GREENFIELD,
MARGARET L. GLASGOW.